United States Patent
Ohmura (10) Patent No.: US 6,836,619 B2
(45) Date of Patent: Dec. 28, 2004

(54) MICROLENS ARRAY, OPTICAL APPARATUS, SINGLE LENS REFLEX CAMERA AND OPTICAL FINDER

(75) Inventor: Yusuke Ohmura, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/174,361

(22) Filed: Jun. 17, 2002

(65) Prior Publication Data

US 2003/0002871 A1 Jan. 2, 2003

(30) Foreign Application Priority Data

Jun. 20, 2001 (JP) .......................................... 2001-186246

(51) Int. Cl.$^7$ .............................................. G03B 13/24
(52) U.S. Cl. ........................ 396/150; 396/382; 359/619
(58) Field of Search ................................ 359/619, 626; 396/150, 382

(56) References Cited

U.S. PATENT DOCUMENTS 5,085,977 A * 2/1992 Sugawara et al. .......... 430/321
5,119,235 A   6/1992 Umeda et al.
5,733,710 A * 3/1998 Kuboya et al. ............. 430/312
6,516,152 B1 * 2/2003 Mukai et al. ............... 396/150
2002/0034710 A1 * 3/2002 Morris et al. ............... 430/321

FOREIGN PATENT DOCUMENTS

JP         2503485           4/1996
JP         2881877           4/1999

* cited by examiner

Primary Examiner—David M. Gray
(74) Attorney, Agent, or Firm—Morgan & Finnegan, LLP (57) ABSTRACT

In the microlens array, a plurality of microlenses are formed with an irregularity or probability-distributed regularity so as to differ from a hypothetical base pattern, the hypothetical base pattern having apexes of hypothetical microlenses each spaced apart from every adjacent microlens thereof by an equal distance L. All the apex positions of the microlenses lie within circles each centered on an apex position in said hypothetical base pattern and having a radius equal to or smaller than 0.3L, or meet a condition: $0.4L \leq P \leq 1.6L$. In this way, a microlens array with bright and clean viewing characteristics and a high reproducibility of a shape of each microlens is provided.

12 Claims, 7 Drawing Sheets

MICROLENS ARRAY, OPTICAL APPARATUS, SINGLE LENS REFLEX CAMERA AND OPTICAL FINDER

BACKGROUND OF THE INVENTION

1. Field of the Invention

The present invention relates to a microlens array used for a screen of an optical apparatus or focusing screen of a single lens reflex camera.

2. Description of the Related Art

Conventionally, it has been known that a microlens array having a plurality of microlenses arranged therein is used as a screen or focusing screen. A microlens array screen has an advantage that it has less granularity than a screen with a microscopic irregularity transferred from an abrasive-machined surface of a mold, and therefore, can provide a clear view.

However, if the microlenses are arranged regularly, a problem arises in that diffracted light is limited to a particular direction and thus an unnatural out-of-focus is provided, or when the microlens array is used with a Fresnel lens, it interferes with an orbicular zone of the Fresnel lens to produce moiré fringes.

As for the microlens array used for the above-described purpose, this problem can be solved if the microlenses or micro concave parts are arranged at random.

In Japanese Patent Laid-Open No. 11-142609 and the like, there are proposed methods of providing a microlens array with a random arrangement.

However, as described later with reference to a method of manufacturing a microlens array, these methods have problems associated with stability in manufacture, efficiency and controllability and are considered difficult to implement.

The conventionally known methods of manufacturing a microlens array include an ion exchange method of forming a plurality of lenses by increasing refractive index of a substrate of a multicomponent glass at a plurality of areas distributed thereon (M. Oikawa, et al., Jpn. J. Appl. Phys. 20(4) L51–54, 1918), and a method of subjecting a photosensitive glass to a heat treatment to crystallize non-sensitized parts thereof, thereby swelling the surface.

With these methods, however, an aperture of each lens cannot be made large with respect to an interval between the lenses, and a radius of curvature of each lens is also small. Thus, it is difficult to design a lens with a large numerical aperture.

Besides, manufacture of a microlens array with a large area needs a large scale manufacturing apparatus. Thus, it cannot be readily manufactured.

As another method, there is a method of manufacturing a microlens array by fabricating an original plate of the microlens array, spreading a material of the lens onto the original plate, and then peeling the material of the lens. To fabricate a mold serving as the original plate, a process of lithography using an electron beam (see Japanese Patent Laid-Open No. 1-231601), a process of shaping a part of a metal plate by etching (see Japanese Patent Laid-Open No. 5-303009), and a process of shaping a metal plate by impression using an indenter (see Japanese Patent Laid-Open No. 11-142609) may be used.

According to this method of manufacturing a microlens array, the microlens can be duplicated by molding, variation from lot to lot hardly results, and the microlens array can be manufactured at low cost. In addition, compared to the ion exchange method, problems associated with a coefficient of thermal expansion, warpage and the like can be avoided.

However, in the case of the process involving an electron beam, it is difficult to fabricate an original plate with a large area of 100 cm square or larger, because an electron beam lithography device is expensive so that a significant capital investment is needed, and an area for lithography is limited.

In the case of the process involving etching, isotropic etching using a chemical reaction is typically used, and thus, even a little change in a composition or crystal structure of the metal plate results in a failure in the etching to provide a desired shape.

In addition, in the case of the process involving etching, the etching continues if washing is not conducted immediately after the desired shape is provided. Thus, when forming a microlens, the resulting shape may be different from the desired one due to the etching advanced from the point in time when the desired shape is provided until the washing.

In the case of the process of impression using an indenter, the indenter is pressed against the mold a number of times corresponding to the number of lenses, and thus, an enormous amount of time is needed to provide a large area. In addition, the microscopic precision thereof is limited mechanically, and the controllability on the order of micrometers is hardly attained.

With many of these conventional methods of manufacturing a microlens, it is extremely difficult to arrange the microlenses randomly in a controlled manner, and thus, the microlens arrangement is poor in reproducibility.

Even if the microlenses are arranged regularly, the conventional methods of manufacturing a microlens have many unreliable factors including the reproducibility of a lens radius, which is an essential parameter of the microlens, and the precision of the position of the arranged lens. Thus, quality control is quite difficult in mass production.

SUMMARY OF THE INVENTION

An object of the present invention is to provide a microlens array with bright and clean viewing characteristics and a high reproducibility of a shape of each microlens.

In order to attain the above object, in the microlens array of this invention, a plurality of microlenses are formed with an irregularity or probability-distributed regularity so as to differ from a hypothetical base pattern, the hypothetical base pattern having apexes of hypothetical microlenses each spaced apart from every adjacent microlens thereof by an equal distance L. In addition, all the apex positions of the microlenses are arranged to lie within circles each centered on an apex position in the hypothetical base pattern and having a radius equal to or smaller than 0.3L < . . . (1)>, or meet a condition:

$$0.4L \leq P \leq 1.6L \tag{2}$$

Thus, a microlens array with bright and clean viewing characteristics and a high reproducibility of a shape of each microlens is provided, which does not suffer from an influence of the diffracted light and occurrence of the moiré strings specific to the cyclic regular arrangement, such as the base pattern, as well as, if the above conditions (1) and (2) are met, local darkening due to a too long distance between the apexes of the adjacent microlenses and granularity caused by the darkening, and local poor diffusion due to a too short distance therebetween.

A detailed configuration of the microlens array, optical apparatus, single lens reflex camera and optical finder of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
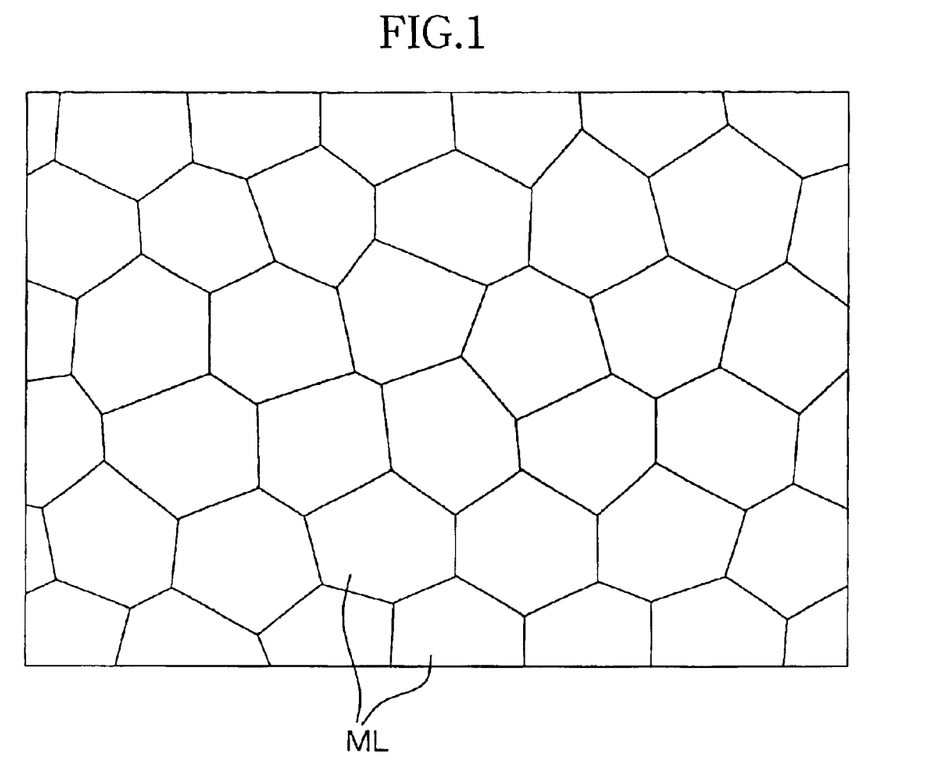
FIG. 1 shows an arrangement of microlenses in a microlens array according to an embodiment of this invention.

FIG. 1 shows a lens arrangement of a microlens array according to an embodiment of this invention. In this embodiment, microlenses are arranged irregularly in such a manner that centers thereof are allowed to be displaced, under a certain condition, from a state where they are formed in a honeycomb configuration and arranged regularly.

Now, a method of arranging microlenses ML shown in FIG. 1 will be described in detail. First, in FIG. 2, apexes (centers) of respective hypothetical microlenses in the case where the hypothetical microlenses are arranged regularly are shown as dots, and each dot is spaced apart from every adjacent dot by an equal distance L. This arrangement is referred to as a hypothetical base pattern herein.

Figure 2:
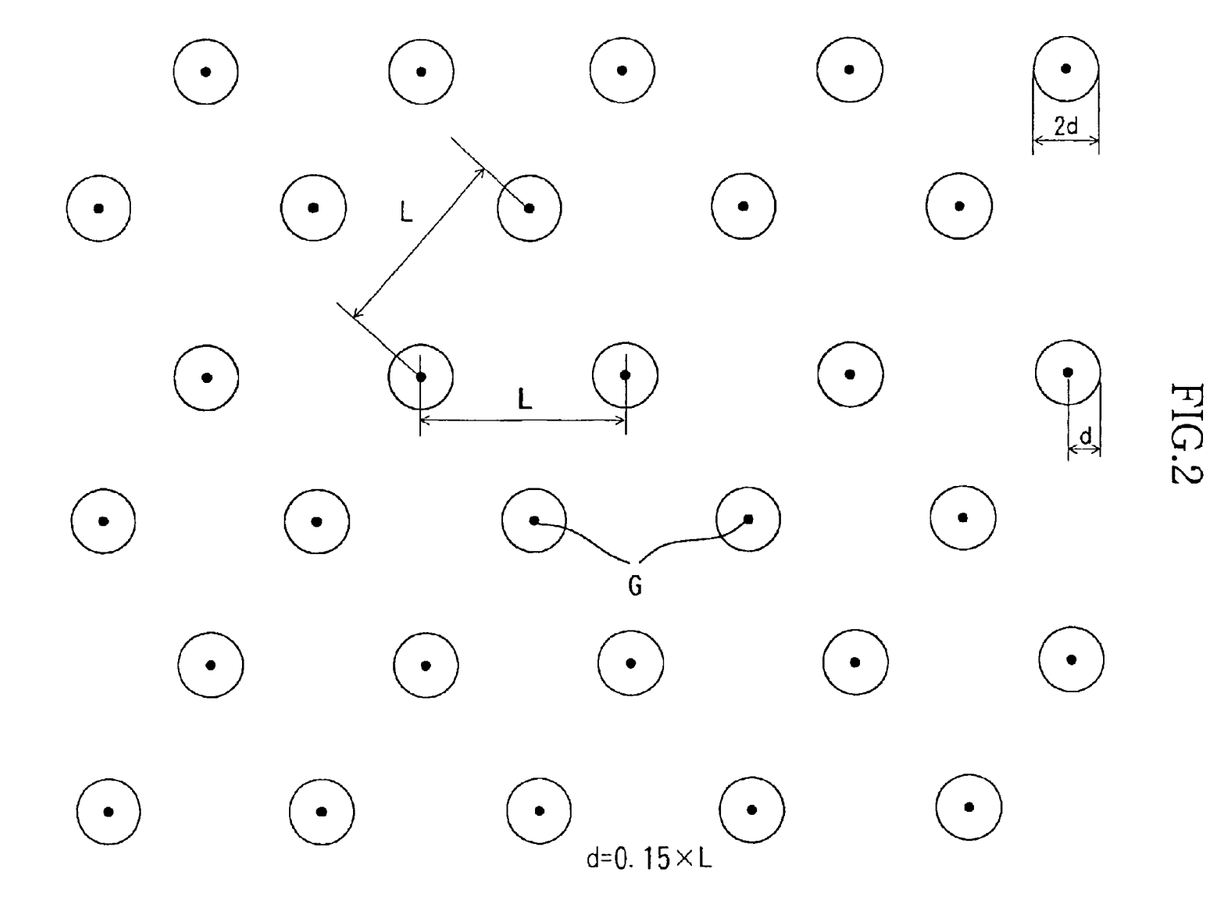
FIG. 2 shows a grid arrangement of a reference base pattern for determining an arrangement of apexes of microlenses in the microlens array shown in FIG. 1.

In the microlens array of this embodiment, a position of each dot in the hypothetical base pattern is regarded as a hypothetical grid point G, and the apexes or centers of the microlenses ML are randomly (irregularly) set within circles each having a radius of d and centered on the respective grid point G shown in FIG. 2.

In the microlens array shown in FIG. 1, there are relations as follows:

L=0.02 mm; and d=0.15×L.

In addition, a focal length f of each microlens is 0.08 mm, so that the microlens array has specifications suitable for use as a focusing screen of an optical finder for a camera having a focal length of an eyepiece of the order of 80 mm.

Figure 3:
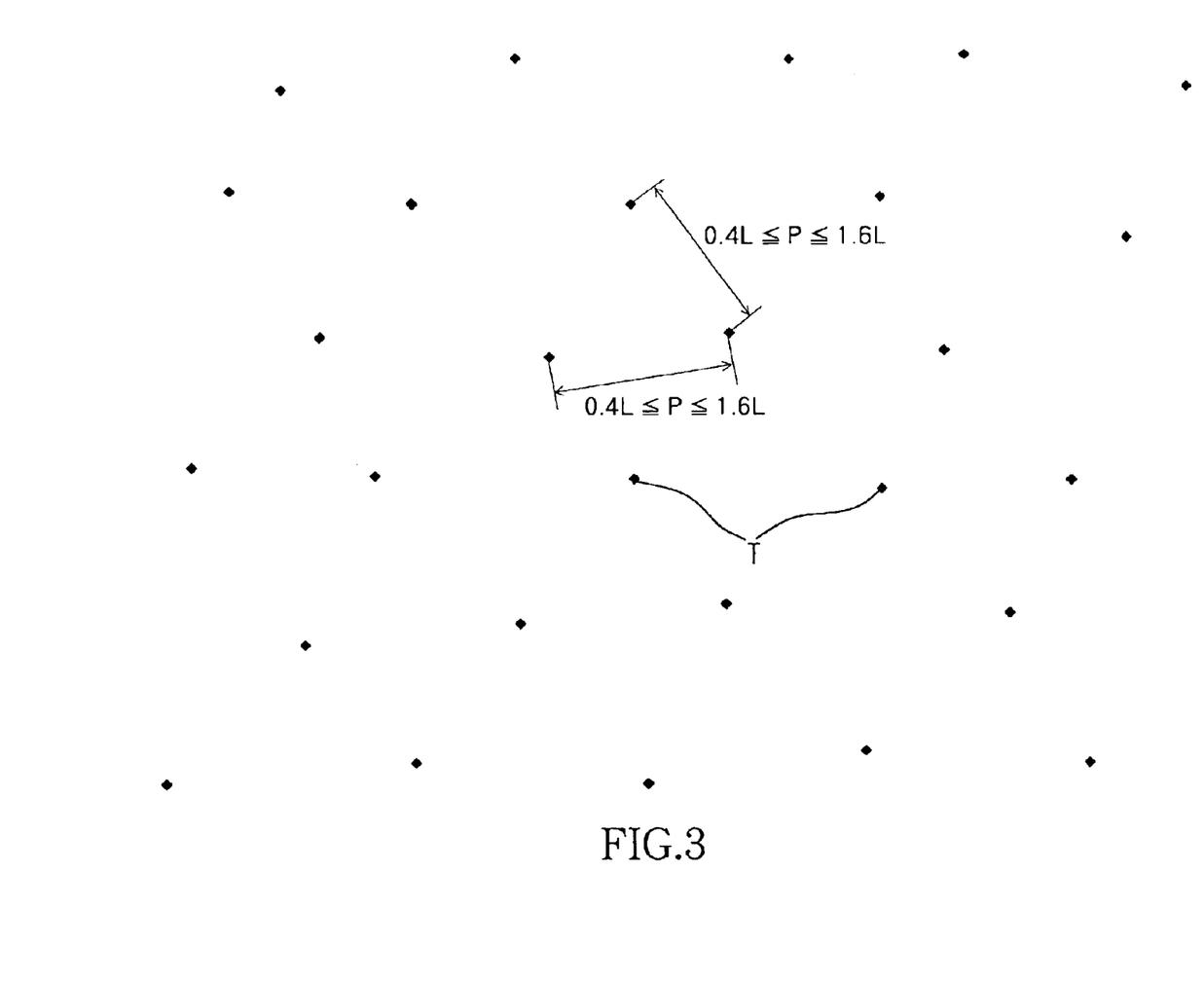
FIG. 3 shows a random grid arrangement of the microlens array shown in FIG. 1.

FIG. 3 shows an example of an arrangement of apex positions T of the microlenses of this embodiment. Here, the apex interval L in the reference base pattern and the focal length f of the microlenses may be appropriately determined according to the optical apparatus to which the array is applied.

In general, as for the optical finder, as the focal length of the eyepiece becomes shorter, a shorter apex interval L is needed, and as an F number of an objective lens used becomes smaller, the focal length of the microlens becomes shorter, and a smaller F number of the microlens is needed.

To provide a microlens array having a good viewing characteristics, all the microlenses are arranged in such a manner that the apex positions thereof T lie within the respective circles centered on the apex positions in the hypothetical base pattern and having a radius d equal to or smaller than 0.3L< . . . (1)>. Here, the microlens array shown in FIG. 1 has the relationship of d=0.15×L, and therefore, it meets the condition (1).

The apex position T of the microlens ML may be located at a distance 0.3L from the hypothetical grid point G or on the hypothetical grid point G.

In this case, an apex interval P between adjacent microlenses meets the following condition:

$$0.4L \leq P \leq 1.6L \quad (2)$$

Here, if the radius d of the above circle is larger than 0.3L, that is, if the apexes of the adjacent microlenses are spaced apart from each other by a distance larger than the upper limit of the condition (2), the distance between the adjacent microlenses is too large, thereby causing local darkening, which leads to granularity of the overall finder and thus degraded quality. Besides, if the apexes of the adjacent microlenses are spaced apart from each other by a distance smaller than the lower limit of the condition (2), a poor diffusion occurs locally.

A diffusion characteristic of a typical camera finder at the time when a light beam is incident thereon is needed to fall within a range from ±5° to ±10°. This is because the F number of an image-taking lens of the camera substantially falls within a range from F2.8 to F5.6.

To check a focal point of the image-taking lens, a luminous flux from the image-taking lens is required to reach an eye of a user regardless of whether it is focused or not. With respect to one of image points, in order to guide an outermost light beam of a luminous flux cone from the image-taking lens to the eye of the user, the outermost light beam is required to reach the eye of the user due to the diffusion characteristic, the user looking at a diffuser in a direction perpendicular thereto.

For this purpose, the F number of the microlens only needs to be equal to that of the corresponding image-taking lens. In practical, to give a priority to brightness of the finder or to support various lenses such as in the single lens reflex camera, the F number of the microlenses is selected to be optimal in terms of design. Thus, the F number of the microlens desirably falls within a range from F2.8 to F5.6.

In this embodiment also, since the centers of the microlenses are located randomly within the respective circles having a radius of d, the apertures varies among the microlenses, and therefore, the F numbers thereof can vary.

Thus, it is assumed that the interval L between the hypothetical grids is equal to the aperture of the microlens on the average, the grid being the center of the area in which the center of the microlens is set, and the focal length of the microlens is denoted by a reference symbol f (f being determined by the lens radius and the same for all the microlenses), the average F number is represented by: Fno.=f/L. and, if the average F number is set to approximately 2.8 to 5.6, an appropriate diffusion characteristic of the camera optical finder can be provided.

Here, a meaning of the condition (1) is to be considered. That is, if the radius d exceeds the upper limit thereof, a variation among the microlenses becomes significant, and the F numbers of partial lenses are beyond the range suitable for the finder, whereby vignetting and granularity are observed.

Figure 4:
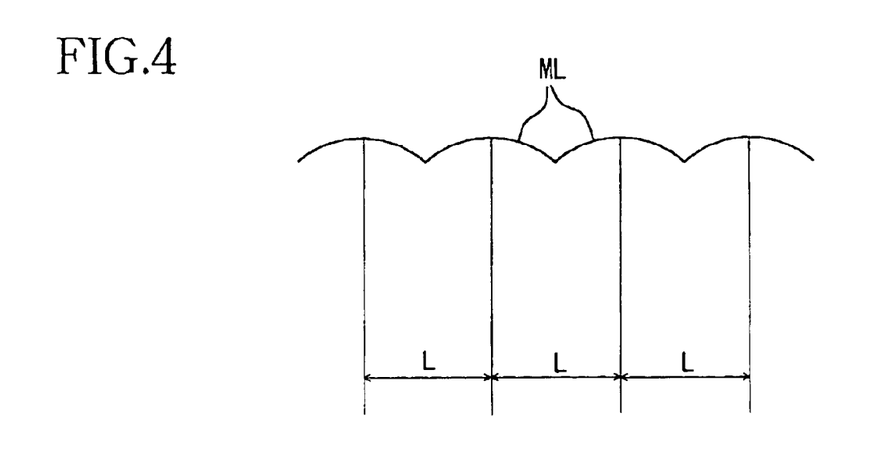
FIG. 4 is a cross-sectional view of microlenses arranged at regular intervals.

This will be described with reference to FIGS. 4 and 5. FIG. 4 is a cross-sectional view of the microlenses ML arranged at regular intervals. As shown, the four lenses are arranged with the interval between adjacent apexes being L, and located at the equally spaced grid points described above.

Figure 5:
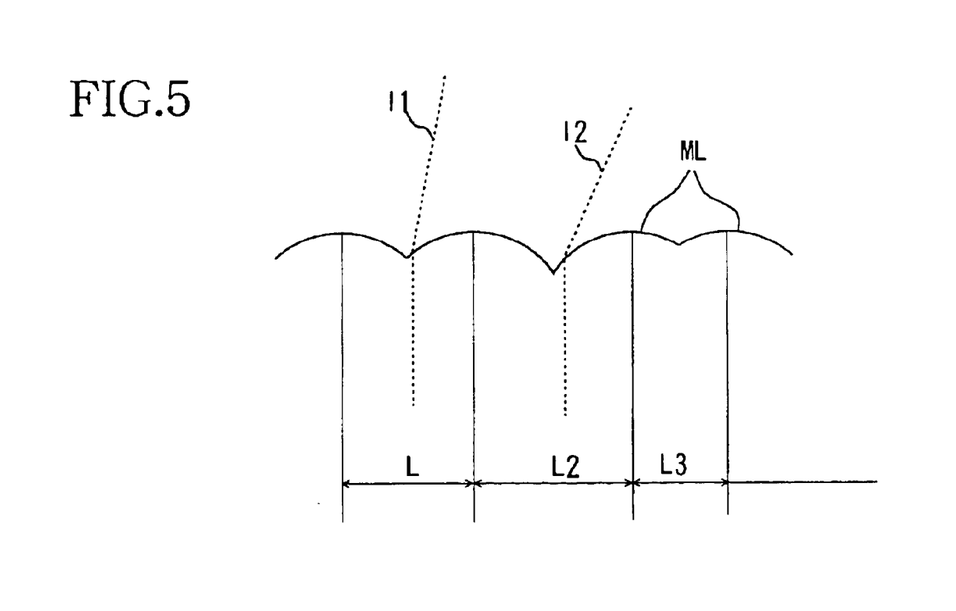
FIG. 5 is a cross-sectional view of microlenses with the apexes arranged randomly.

FIG. 5 is a cross-sectional view of the microlenses ML with the apexes thereof arranged randomly as in the above embodiment. Since the apexes of the lenses are displaced from those shown in FIG. 4, the lenses are arranged in a relationship:

L3<L<L2.

In FIG. 5, light beams 11, 12 incident on ends of the microlenses ML are indicated by dot lines. Although the light beam 11 incident on the end of the microlens, the apex of which is spaced apart from that of the adjacent lens by L, is refracted by the lens, a large angle of refraction is not attained because of the large F number of the partial lens.

On the contrary, the light beam 12 incident on the end of the microlens, the apex of which is spaced apart from that of the adjacent lens by L2, is also refracted by the lens, and a large angle of refraction is attained because of the small F number of the partial lens. As a result, although the light beam 11 is incident on a pupil of the user, the light beam 12 is deviated from the pupil of the user and observed as a local vignetting, that is, darkening.

In particular, when a dark lens with a large F number is used, this reduction becomes remarkable. Thus, imparting randomness beyond the upper limit of the condition (1) to the apex position of the microlens results in such a local darkening appearing at many locations, which is undesirable.

A method of manufacturing the above described microlens array will be now described. In this embodiment, using a method of fabricating a microlens proposed in Japanese Patent Laid-Open No. 2000-43054, a microlens array with a random arrangement controlled under a certain condition is manufactured.

Figure 6:
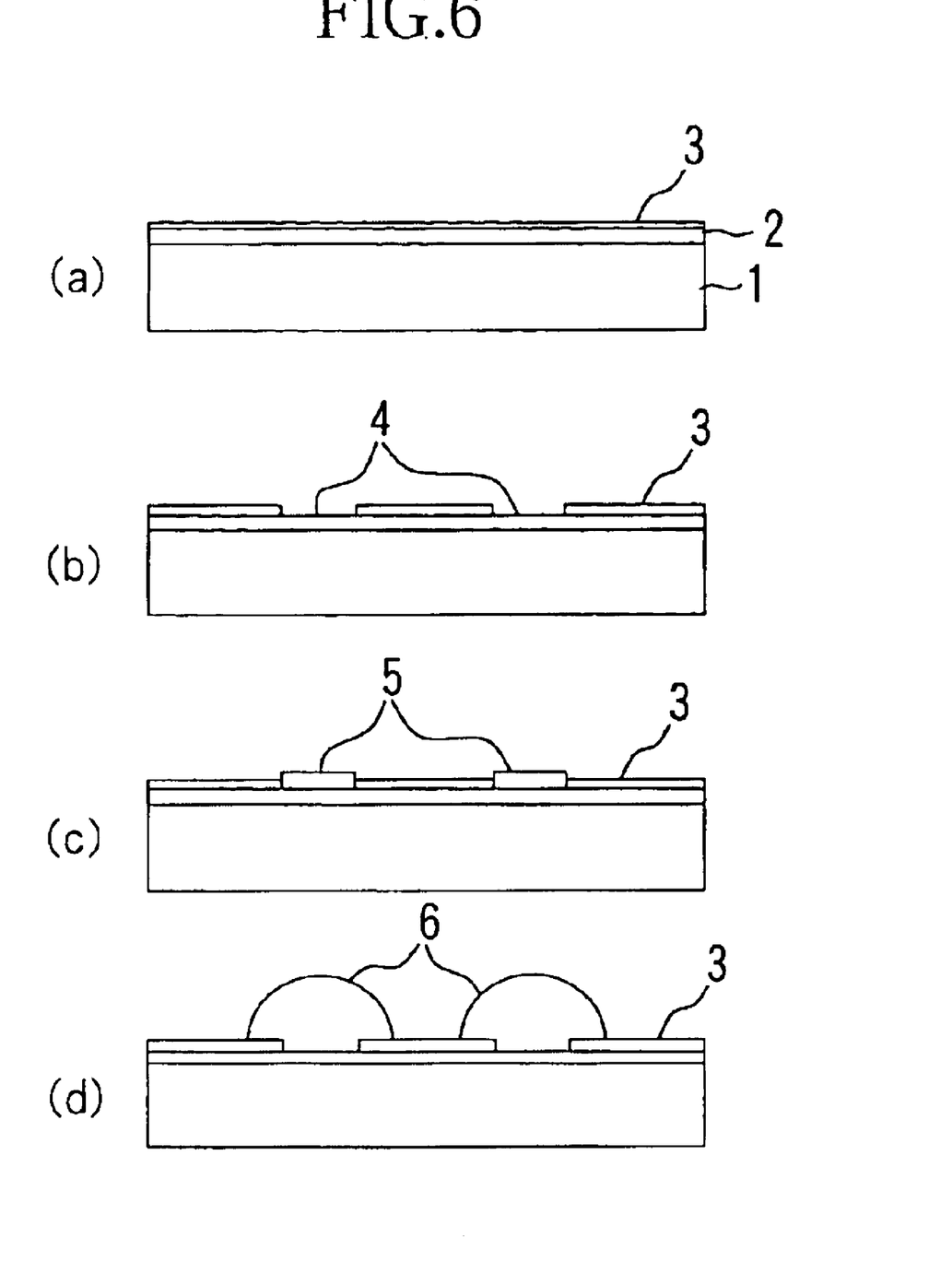
FIG. 6 is a diagram for illustrating a principle of a method of manufacturing the microlens shown in FIG. 1.

In this manufacturing method, as shown in FIGS. 6(a) to 6(d), an insulating mask layer 3 is formed on a substrate 1 having a conductive or electrode layer 2, (shown in FIG. 6(a)) and an opening 4 is provided in the mask layer 3 (shown in FIG. 6(b)). Then, an electrodeposited layer 5 is formed in the opening 4 by an electrodeposition mechanism (plating) of an organic compound via the opening 4 (shown in FIG. 6(c)). The plating is continuously performed to extend the electrodeposited layer over the surface of the mask layer 3, thereby forming a microlens 6 (shown in FIG. 6(d)). This is a so-called micromachining technique involving plating.

In this method, by using lithography for the opening in the mask layer, a high positional precision of the microlens can be readily attained.

In the above described embodiment, the arrangement of the microlenses to meet the conditions (1) and (2) has been described. However, the microlenses may be arranged to meet only the condition (2).

In this case, the apex of the microlens may be located outside the circle which is centered on the apex position in the base pattern and has a radius d equal to or smaller than 0.3L, or located apart from the grid point within the circle. Alternatively, it may be located on the grid point.

Figure 7:
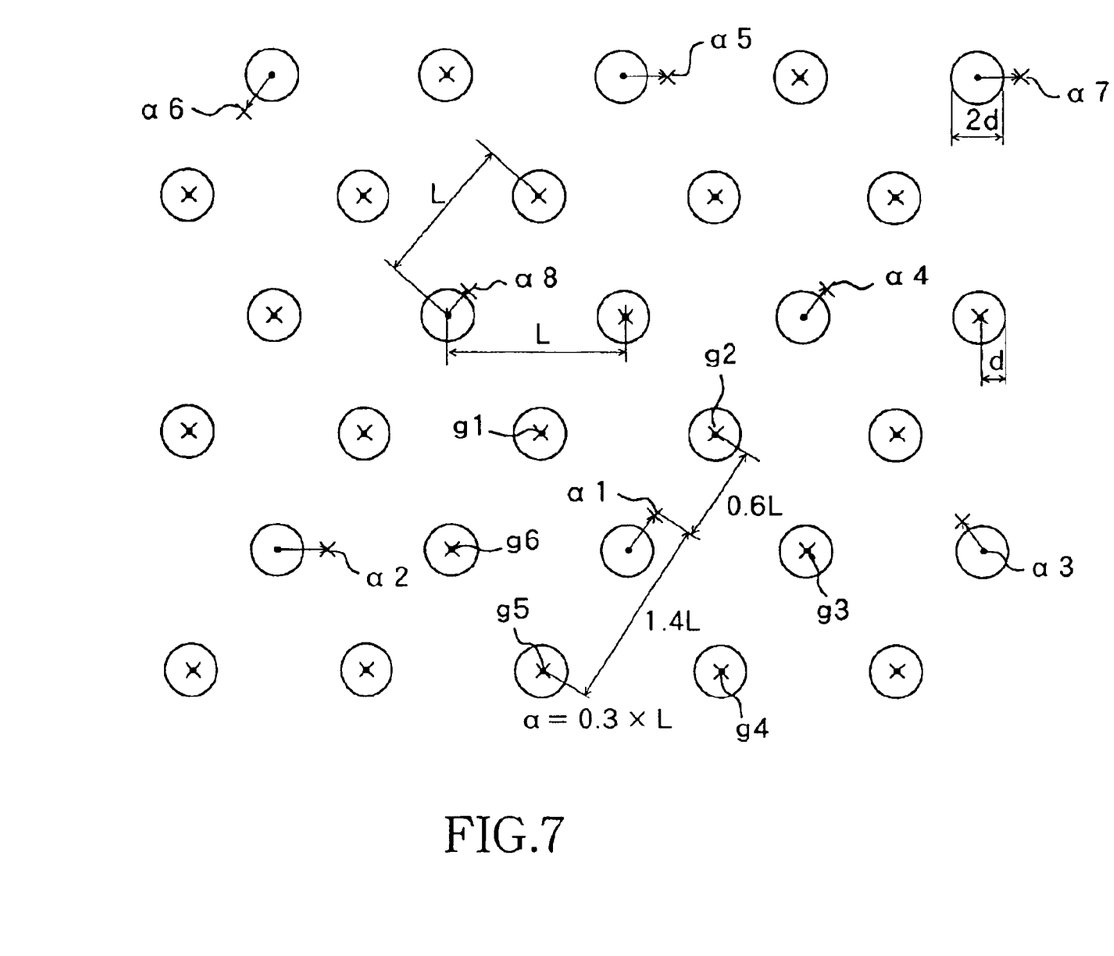
FIG. 7 shows an arrangement of microlenses in a microlens array according to another embodiment of this invention.

FIG. 7 shows another embodiment of this invention, that is, an arrangement of microlenses that meets only the condition (2).

In this drawing, a symbol×indicates a coordinate of a center (Apex) of a microlens, and a dot indicates a grid point in the base pattern, and a circle has a radius of 0.3×L, where L being the apex interval.

Reference symbols α1 to α8 denote apex positions shifted from the grid (hypothetical grid) positions arranged at regular intervals. Lens apexes other than and around the apexes α1 to α8 correspond with the grid coordinates arranged at regular intervals.

The arrangement will be described with respect to the apex α1 herein. The apex α1 is shifted from the grid coordinate thereof, and surrounded by six microlenses corresponding with the grid coordinates g1 to g6, respectively.

A positional relationship of the apex α1 with the grid coordinates g1 to g6 is as follows: a distance from the closest grid coordinate g2 is 0.6L; a distance from the farthest grid coordinate g5 is 1.4L; and distances from other lenses surrounding it are larger than 0.6L and smaller than 1.4L.

In this arrangement, one microlens shifted from the grid thereof and six microlenses surrounding the same and having apexes corresponding with the respective grids constitute a group.

However, the six microlenses surrounding one microlens shifted from the grid thereof are also located around another microlens shifted from the grid thereof. This relationship occurs repeatedly.

For example, the grid coordinate g3 denotes one of the microlenses surrounding the apex α1, it simultaneously denotes one of the lenses surrounding the apex α3. Even with such a configuration in which seven lenses constitute one group, a good relationship between uniformity of the arrangement and granularity, which is an object of this invention, can be maintained.

In the respective embodiment described above, a case in which the apex positions of the microlenses are randomly set within a range to meet the above conditions (1) and (2) has been described. However, the apex positions may be set with a probability-distributed regularity, rather than the cyclic regularity as in the base pattern.

Now, an example of such a method will be described. Herein, a method will be described in which a distribution model of a large number of coordinates according to a certain probability distribution is previously created, and a coordinate is selected among from them at random.

<Algorithm for Generate Coordinate Data of Microlens Center (Apex)>

It is essential that a coordinate generated lies within a circle having a specified radius and centered on a regular pattern. Thus, a random number r and a random number Θ are generated, a maximum value of the random number r being the specified radius rmax, and the random number Θ ranging from 0 to $2\pi$, and X and Y coordinates are generated based on the two random numbers.

First, a regular pattern comprising regular triangles regularly arranged is defined as a grid coordinate.

However, the grid coordinate may be any type as far as it is regularly arranged. For example, the grid coordinate may be an arrangement of squares.

Assuming that each of the apexes of the arranged regular triangles is a grid coordinate, a grid coordinate of n rows and m columns is represented by:

$X\text{grid} = m \times L$ (n being an odd number);

$X\text{grid} = m \times L + L/2$ (n being an even number; and $Y\text{grid} = (n-1) \times \sqrt{3} \times L/2$, where L denotes a length of a side of the regular triangle.

Here, a distance (r) from the grid coordinate and an angle (Θ) with respect to a reference coordinate system are defined by the RND function, respectively.

If the RND( ) is assumed as a function to generate a random number 0 to 1:

r=RND( )×R . . . a random number 0 to R is generated;

Θ=RND( )×2×π . . . a random number 0 to 2π is generated;

$X$rnd=$r$×cos (Θ) . . . a random component of an $x$ coordinate;

$Y$rnd=$r$×sin (Θ) . . . a random component of a $y$ coordinate;

$X$=$X$grid+$X$rnd; and $Y$=$Y$grid+$Y$rnd.

These are obtained for all the grids (n, m).

If the random components of X and Y coordinates are generated in this method, the radius from the grid coordinate center varies uniformly according to the random number, so that the probability is reduced in inverse proportion to the distance from the grid coordinate center (denser near the grid center).

To provide a uniform probability within a given radius, the random components of the X and Y coordinates are directly generated within a square centered on the grid coordinate as follows:

$X$rnd=2$r$×RND( )−$r$ . . . a random component of an $x$ coordinate;

$Y$rnd=2$r$×RND( )−$r$ . . . a random component of a $y$ coordinate.

Here, it is determined whether a condition of $r^2 \geq X\text{rnd}^2 + Y\text{rnd}^2$ is met or not, and a value that meets this condition may be adopted. If thus defined, the lens centers are uniformly distributed within the respective areas of radius r.

When displacements are set using random numbers in this way, the arrangement can be controlled by providing an arbitrary distribution rather than a uniform distribution as random numbers. For example, there can be contemplated a method of selecting a coordinate according to a prescribed probability distribution by previously creating a distribution model of a large number of coordinates according to a probability distribution such as a normal distribution, assigning a sequence of numbers to the coordinates, and then selecting a number among from them at random. This method presents no problem practically, although it is a pseudorandom setting.

Besides, if a distribution is set in which probability is higher near the grid center, the regularity of the arrangement pattern becomes higher. If a distribution is set in which probability is lower near the grid center, a more random arrangement is provided. This tendency of the arrangement determines a property of the microlens array or diffuser. The arrangement with high regularity exhibits a discrete angle dependency of diffusion due to an affection of diffraction, and the arrangement with high randomness exhibits a continuous angle dependency of diffusion.

Figure 8:
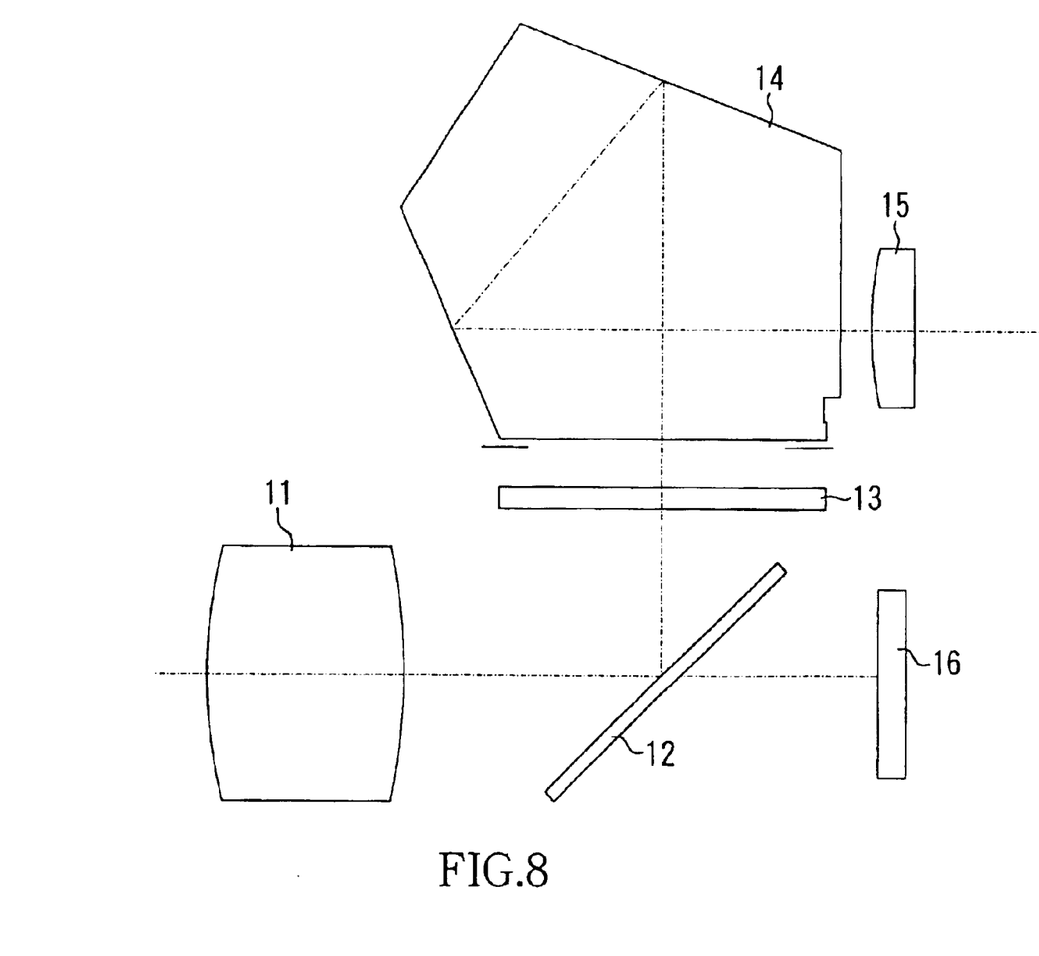
FIG. 8 is a diagram showing an optical system of a single lens reflex camera using as a focusing screen the microlens array according to each of the above embodiments.

FIG. 8 shows an optical system of a single lens reflex digital camera using as a focusing screen the microlens array according to each of the above embodiments.

A luminous flux from an object passes through an image-taking lens 11, is reflected by a quick return mirror 12 disposed in an image-taking optical path, and then focused on a focusing screen 13.

An object image focused on the focusing screen 13 is diffused by the microlens array, reversed by a pentaprism 14, and thus observed through an eyepiece 15 as an erect image.

The diffusion by the microlens array depends on the arrangement in the microlens array or radius of the microlens, and has an effect on ease of focusing, appearance of out-of-focus image, granularity of the focusing screen itself and the like.

As in this embodiment, by using the microlens array according to each of the above embodiments as the focusing screen 13, characteristics required for the focusing screen can be adequately provided.

Reference numeral 16 in FIG. 8 denotes a solid state image pickup device, which is constituted by a CCD, CMOS or the like. If the quick return mirror 12 is a half mirror, the object image formed by the light flux having transmitted through the quick return mirror 12 is photoelectrically converted by the image pickup device 16, and the resulting image is displayed on a display (not shown), such as a liquid crystal view finder. When a shoot switch (not shown) is turned on to retract the quick return mirror 12 from the image-taking optical path, the object image formed by means of the image-taking lens 11 is photoelectrically converted by the image pickup device 16, and the resulting shot image is stored in an electrical storage medium (not shown), such as a memory.

In the above described embodiments, the microlens array having a specification suitable for the focusing screen used in the optical finder of the camera has been described. However, this invention can be applied to a microlens array screen or diffuser used in various optical apparatuses.

As described above, according to the above described embodiments, a microlens array with bright and clean viewing characteristics and a high reproducibility of a shape of each microlens can be provided, which does not suffer from an influence of the diffracted light and occurrence of the moiré strings specific to the cyclic regular arrangement, such as the hypothetical base pattern, as well as, if the above conditions (1) and (2) are met, local darkening due to a too long distance between the apexes of the adjacent microlenses and granularity caused by the darkening, and local poor diffusion due to a too short distance therebetween.

While preferred embodiments have been described, it is to be understood that modification and variation of the present invention may be made without departing from the sprit or scope of the following claims.

What is claimed is:

1. A microlens array, comprising:
   a plurality of microlenses formed with a regularity so as to differ from a hypothetical base pattern, the hypothetical base pattern having apexes of hypothetical microlenses each spaced apart from every adjacent microlens thereof by an equal distance L,
wherein the apex positions of the microlens lie within circles each centered on an apex position in said hypothetical base pattern and having a radius equal to or smaller than 0.3L and the microlens has an average F number of approximately 2.8 to 5.6.

2. An optical apparatus, comprising:
   the microlens array according to claim 1.

3. A single lens reflex camera, comprising:
   a focusing screen constituted by a microlens array according to claim 1.

4. An optical finder, comprising:
   a focusing screen constituted by a microlens array according to claim 1.

5. A microlens according to claim 1, wherein said plurality of microlenses are formed with a probability-distributed regularity in which the probability increases for the apex positions to exist in a region nearest to the apex position in said hypothetical base pattern.

6. A microlens according to claim 1, wherein said plurality of microlenses are formed with a probability-distributed regularity in which the probability increases for the apex positions to exist in a region farther from the apex position in said hypothetical base pattern.

7. A microlens array, comprising:
a plurality of microlenses formed with a regularity so as to differ from a hypothetical base pattern, the hypothetical base pattern having apexes of hypothetical microlenses each spaced apart from every adjacent microlens thereof by an equal distance L,
wherein an apex interval P between microlenses adjacent to each other meets the following condition:

$$0.4L \leq P \leq 1.6L, \text{ and}$$

the microlens has an average F number of approximately 2.8 to 5.6.

8. An optical apparatus, comprising:
the microlens array according to claim 7.

9. A single lens reflex camera, comprising:
a focusing screen constituted by a microlens array according to claim 7.

10. An optical finder, comprising:
a focusing screen constituted by a microlens array according to claim 7.

11. A microlens according to claim 7, wherein said plurality of microlenses are formed with a probability-distributed regularity in which the probability increases for the apex positions to exist in a region nearest to the apex position in said hypothetical base pattern.

12. A microlens according to claim 7, wherein said plurality of microlenses are formed with a probability-distributed regularity in which the probability increases for the apex positions to exist in a region farther from the apex position in said hypothetical base pattern.

* * * * *